United States Patent [19]
Acampora et al.

[11] 4,167,988
[45] Sep. 18, 1979

[54] RATCHETING MECHANISM FOR CIRCUIT BREAKER MOTOR OPERATOR

[75] Inventors: Vincent P. Acampora; James I. Smith, both of Bristol, Conn.

[73] Assignee: General Electric Company, New York, N.Y.

[21] Appl. No.: 917,214

[22] Filed: Jun. 20, 1978

[51] Int. Cl.[2] .......................... H01H 3/30; F03G 1/08

[52] U.S. Cl. ............................ 185/40 R; 200/153 SC

[58] Field of Search ............ 200/155 R, 156, 153 SC, 200/330; 185/40 R, 40 A, 40 B, 40 C, 40 D, 40 E, 40 F, 40 H, 40 L, 40 M, 40 S

[56] References Cited

U.S. PATENT DOCUMENTS 4,095,676 6/1978 Howe et al. .................. 200/153 SC

*Primary Examiner*—Houston S. Bell, Jr.

*Attorney, Agent, or Firm*—Robert A. Cahill; Walter C. Bernkopf; Philip L. Schlamp

[57] ABSTRACT

A ratchet wheel is advanced by an oscillating driving pawl in conjunction with a holding pawl to charge circuit breaker mechanism closing springs. A latch operates in response to the initial lifting of the holding pawl as the ratchet wheel is rapidly advanced by the closing springs to detain the holding pawl in an inoperative position while the closing springs discharge. Lifting of the driving pawl by the advancing ratchet wheel leaves the driving pawl in an inoperative position by virtue of a unique slip clutch coupling between it and its driving motor. The latch releases the holding pawl for return to its operative position automatically during the initial oscillation of the driving pawl to start a new charging cycle.

10 Claims, 4 Drawing Figures

RATCHETING MECHANISM FOR CIRCUIT BREAKER MOTOR OPERATOR

BACKGROUND OF THE INVENTION

A common design for circuit breaker motor operators utilizes a ratcheting mechanism for coupling the drive of an electromotive device, such as a motor, to the breaker operating mechanism pursuant to charging its contact closing springs. Examples of such circuit breaker motor operator ratcheting mechanisms can be seen in U.S. Pat. Nos. 3,097,275; 3,525,956; 3,585,330; 3,600,540; 3,652,815; 3,773,995; 3,806,684; and 3,944,772. Basically, these ratcheting mechanisms include a driving pawl coupled with the electromotive device for incrementally advancing a ratchet wheel coupled with the breaker operating mechanism. Each incremental advance of the ratchet wheel is sustained by a holding pawl. Ultimately, the ratchet wheel is advanced to an angular position where the closing springs are fully charged and therefore empowered to forcibly close the breaker contacts. Typically, the discharge of the closing springs rapidly drives the ratchet wheel in the same direction as did the driving pawl in charging the closing springs. In the process, the teeth on the ratchet wheel impact with the driving and holding pawls, producing undue pawl and ratchet wear, as well as unnecessary stress on the pawl springs and mountings. Moreover, when the breaker contacts close, there is an inevitable rebound which tends to rotate the ratchet wheel somewhat in the opposite direction. Under these circumstances, the straight sides of the ratchet teeth impact against the straight edges of the pawl tips, causing potentially damaging stresses in the ratcheting mechanism.

It is accordingly an object of the present invention to provide an improved ratcheting mechanism for circuit breaker motor operators.

A further object is to provide a circuit breaker motor operator which utilizes a ratcheting mechanism of improved construction and enhanced operating life.

Another object is to provide a motor operator of the above character wherein the ratcheting mechanism includes means for automatically detaining the ratcheting pawls in inoperative positions removed from the ratchet wheel while the ratchet wheel is being overdriven by the circuit breaker operating mechanism.

An additional object is to provide a circuit breaker motor operator ratcheting mechanism of the above character which is efficient in design, inexpensive to manufacture and reliable in operation.

Other objects of the invention will in part be obvious and in part appear hereinafter.

SUMMARY OF THE INVENTION

In accordance with the present invention, there is provided an improved ratcheting mechanism having specific, but not limited application to motor operators for charging the closing springs of a circuit breaker operating mechanism. To this end, a ratchet wheel is keyed on a shaft drivingly coupled to the breaker operating mechanism. A driving pawl oscillated by a suitable electromotive device, such as an electric motor, engages the ratchet wheel teeth to incrementally advance the ratchet wheel pursuant to charging the breaker operating mechanism closing springs. The driving pawl is coupled with the motor crank via a slip clutch effective in producing a moment on the driving pawl in a direction to urge its tip into engagement with the ratchet wheel periphery throughout a charging cycle. Each incremental advance of the ratchet wheel is sustained by a holding pawl to store each incremental charge imparted to the closing springs. When the closing springs are fully charged, the ratchet wheel will have been advanced to an angular position where the driving pawl encounters a smooth section of the ratchet wheel periphery where a ratchet tooth has been removed. The driving pawl thus becomes ineffective to further incrementally advance the ratchet wheel, and its oscillation is terminated.

At this ratchet wheel angular position, the charged closing springs are conditioned to forcibly close the breaker contacts with a consequent overdriving of the ratchet wheel in the same direction as did the driving pawl in charging the closing springs. In order to control the moment of closure of the breaker contacts, the ratchet wheel carries an abutment which encounters a prop as the ratchet wheel arrives at the spring charged angular position. This prop sustains this ratchet wheel position against the force of the charged closing springs until contact closure is desired, whereupon the prop is removed.

In accordance with a signal feature of the present invention, a latch is automatically operative to hold the holding pawl in inoperative positions removed from the ratchet wheel as the latter is overdriven by the discharging closing springs incident to breaker contact closure. A pin carried by the holding pawl controllably maintains the latch in a non-latching position against the bias of a latch spring so long as the holding pawl is engaged with the ratchet wheel periphery under the bias of the holding pawl spring. When the ratchet wheel is overdriven by the discharging closing springs, the ratchet teeth overrun the pawls, kicking them to inoperative positions. The driving pawl remains in its inoperative position since the moment urging it to its operative position ceased with the termination of driving pawl oscillation. With the holding pawl kicked to its inoperative position, its pin frees the latch for movement under the bias of the latch spring to its latching position effective in detaining the holding pawl in its inoperative position against the bias of its spring. Thus both pawls are safely removed from the ratchet wheel periphery during the closing spring discharge cycle.

After the breaker contacts have closed and it is desired to recharge the closing springs, the motor is energized to oscillate the driving pawl. A pin carried by the driving pawl picks up and moves the latch to its non-latching position, allowing the holding pawl to return to its operative position in engagement with the ratchet wheel periphery.

The invention accordingly comprises the features of construction and arrangement of parts which will be exemplified in the construction hereinafter set forth, and the scope of the invention will be indicated in the claims.

For a better understanding of the nature and objects of the invention, reference should be had to the following detailed description taken in conjunction with the accompanying drawings, in which.

Corresponding reference numerals refer to like parts throughout the several views of the drawings.

DETAILED DESCRIPTION

Figures 1, 2:
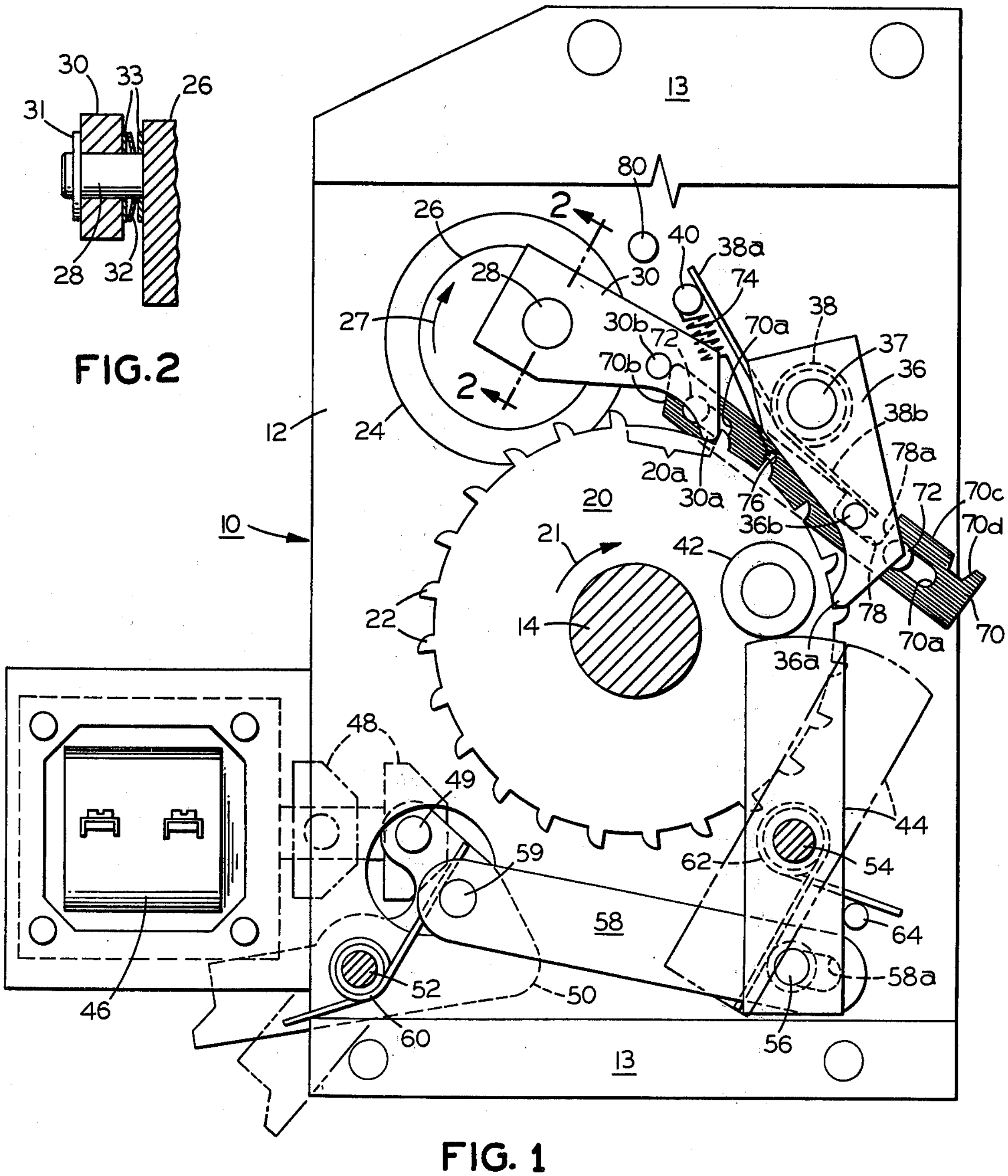
FIG. 1 is a side elevational view of a ratcheting mechanism constructed in accordance with an embodiment of the present invention as utilized in a circuit breaker motor operator.
FIG. 2 is a sectional view taken along line 2—2 of FIG. 1.
Figure 4:
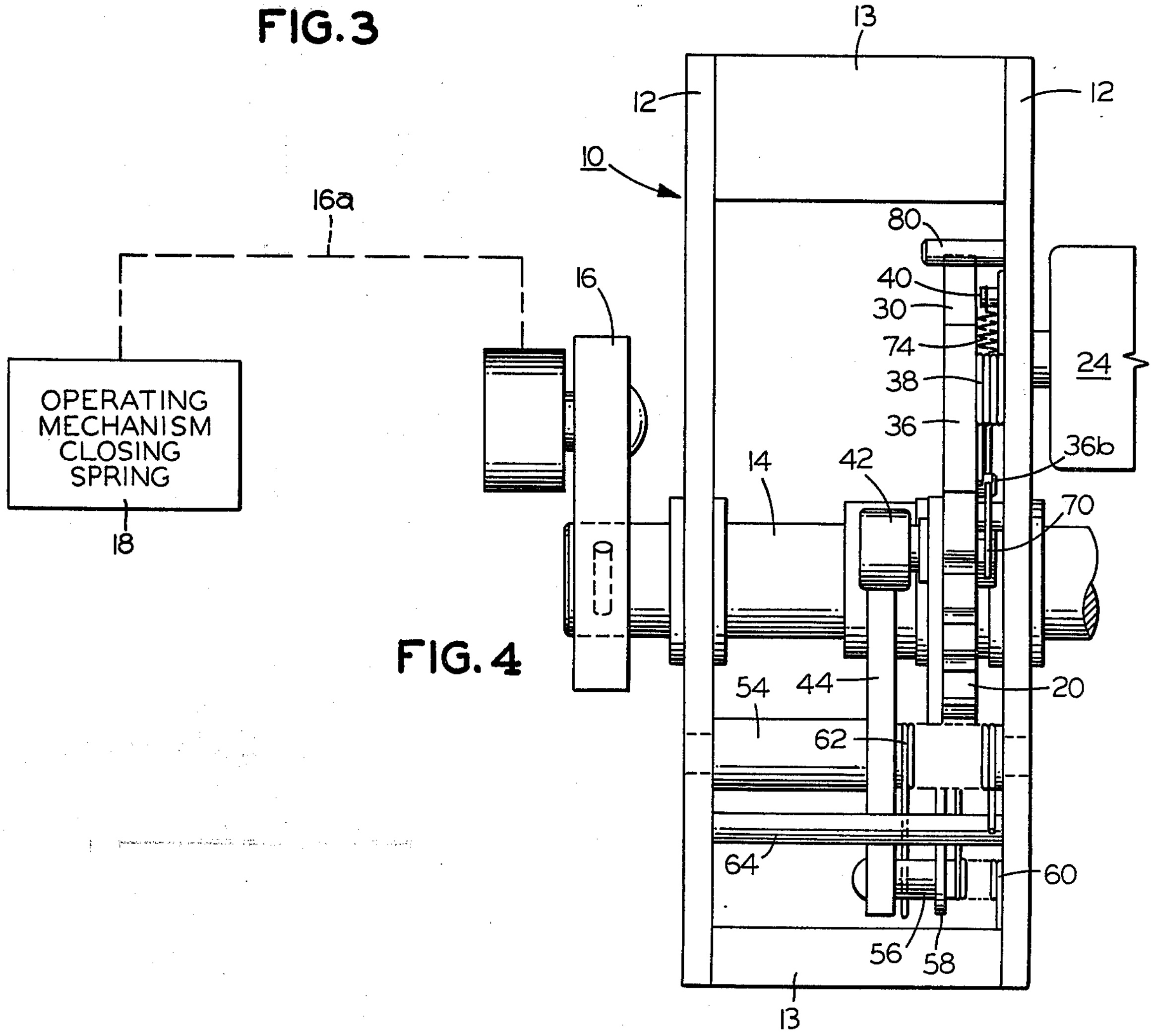
FIG. 4 is an end view of the ratcheting mechanism of FIG. 1.

The ratcheting mechanism of the present invention, generally indicated at 10 in FIGS. 1 and 4, has its operating elements mounted by a frame consisting of a pair of spaced sideplates 12 interconnected by upper and lower cross-frame members 13. As seen in FIG. 4, the frame sideplates 12 journal a ratcheting mechanism output shaft 14 having affixed to its left end a crank 16 which is mechanically coupled, pursuant to the illustrated application of the ratcheting mechanism in a circuit breaker motor operator, to breaker operating mechanism closing springs 18, as diagrammatically indicated at 16*a*. Keyed on this output shaft at a location intermediate the frame sideplates in a ratchet wheel 20 carrying a peripheral array of ratchet teeth 22.

To drive the ratcheting mechanism, a motor 24 drivingly rotates a crank 26 in the clockwise direction, as indicated by arrow 27 in FIG. 1, to revolve an eccentric crank pin 28 on which is journaled a driving pawl 30. As seen in FIG. 2, a retaining ring 31 captures driving pawl 30 on crank pin 28, while at the same time compressing a Belleville washer 32 sandwiched between two flat washers 33 carried on the crank pin intermediate the driving pawl and crank 26. By virtue of this construction, there is provided a frictional, slip clutch coupling between crank 26 and driving pawl 30 which serves during rotation of the crank to impart a clockwise moment on the driving pawl acting about crank pin 28. From FIG. 1, it is seen that this clockwise moment is effective in continuously urging the tip 30*a* of driving pawl into engagement with the periphery of ratchet wheel 20. Thus, requisite peripheral engagement of the driving pawl with the ratchet wheel pursuant to incrementally advancing the ratchet wheel in the clockwise direction, indicated by arrow 21, is achieved without the use of torsion or tension springs as has been the practice heretofore.

Each incremental clockwise advance of ratchet wheel 20 by oscillating driving pawl 30 imparts a corresponding incremental charge to operating mechanism closing springs 18. To preserve each incremental charge, the ratcheting mechanism includes a holding pawl 36 pivotally mounted on a post 37 mounted by the right frame sideplate 12 seen in FIG. 4. To bias the tip 36*a* of holding pawl into engagement with the periphery of ratchet wheel 20, a torsion spring 38, carried by post 37, has one end 38*a* acting against a post 40 mounted by right frame sideplate 12 and its other end 38*b* acting against a pin 36*b* carried by the holding pawl.

Upon completion of a closing spring charging cycle, ratchet wheel 20 will have been advanced in the clockwise direction to the angular position seen in FIG. 1 where the tip 30*a* of driving pawl 30 will encounter a section 20*a* of the ratchet wheel periphery from which a ratchet tooth 22 has been removed. Consequently, continued oscillation of the driving pawl by motor 24 is ineffective in further incrementally advancing ratchet wheel 20. In fact, when ratchet wheel 20 arrives at this spring charged angular position, the charged closing springs 18 become conditioned to discharge pursuant to powering the closure of the circuit breaker contacts which incidentally results in the ratchet wheel being overdriven in the clockwise direction by the discharging closing springs. To afford control over the moment of closure of the breaker contacts and also to provide the opportunity to de-energize motor 24, a post 42 carried by ratchet wheel 20 encounters the upper edge of a prop 44 when the ratchet wheel is advanced to its closing spring charged angular position seen in FIG. 1. As long as prop 44 is in its solid line position, clockwise rotation of the ratchet wheel is inhibited, and the closing springs 18 cannot discharge to close the breaker contacts. To articulate prop 44 to its phantom line position pursuant to enabling a discharge cycle of the closing springs, a closing solenoid 46 has its plunger 48 pivotally connected at 49 to one end of a bell crank 50 pivotally mounted on a post 52 mounted by the right frame sideplate 12 (FIG. 4). Prop 44 is pivotally mounted intermediate its ends on a rod 54 mounted between frame sideplates 12 and carries adjacent its lower end a pin 56 which is received in an elongated slot 58*a* formed adjacent the right end of an elongated link 58. The left end of this link is pivotally connected to bell crank 50 via a pin 59 carried by the latter.

From the foregoing description, it is seen that upon energization of closing solenoid 46, its plunger 48 is pulled into its phantom line position, causing bell crank 50 to be pivoted in the counterclockwise direction about its pivot post 52. In the process, link 58 is pulled generally leftward, and when the right end of the elongated slot 58*a* impacts against pin 56, prop 44 is kicked in the clockwise direction about its pivot rod 54 to the illustrated phantom line position. With the removal of prop 44 from engagement with post 42, ratchet wheel 20 is freed for rotation in the clockwise direction, and thus the closing springs 18 are permitted to discharge pursuant to driving the breaker contacts to their closed positions. The provision of the lost motion connection between link 58 and prop 44 permits the solenoid plunger to acquire some momentum before it is called upon to pivotally move prop 40 out of engaging relation with post 42. Once energization of closing solenoid 46 is terminated, torsion spring 60 returns plunger 48 to its retracted position and link 58 to its rightmost position, while torsion spring 62 returns prop 44 to its solid line position determined by engagement with a stop post 64 carried by frame sideplate 12.

Figure 3:
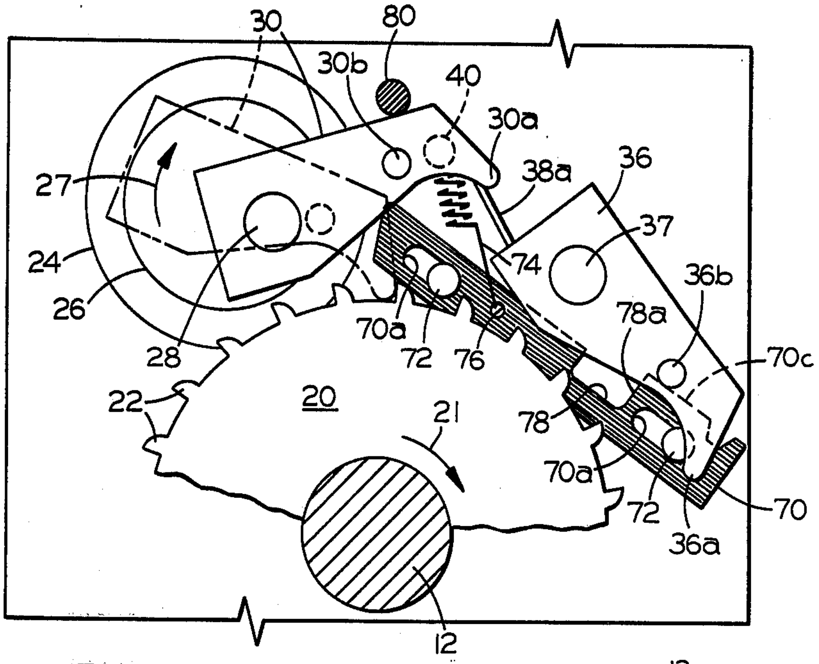
FIG. 3 is a fragmentary side elevational view of the ratcheting mechanism of FIG. 1 illustrating the pawls latched up during a closing spring discharge cycle.

In accordance with a signal feature of the present invention, the driving and holding pawls are automatically held or latched up in disengaged relation to the ratchet wheel periphery during a closing spring discharge cycle while the ratchet wheel is being rapidly overdriven in the clockwise direction by the discharging closing springs. As a consequence, undue wear of the pawl tips and ratchet teeth is precluded, as is damage to these parts by the inevitable rebounding or momentary counterclockwise rotation of the ratchet wheel as the breaker movable contacts impact against the stationary contacts. To this end, an elongated latch 70 is provided with a pair of longitudinally elongated slots 70*a* in which are received posts 72 carried by the right frame sideplate 12 pursuant to slidably mounting this latch in operative relation with the driving and holding pawls. A tension spring 74, anchored at one end to post 40 and at its other end to a hole 76 carried by latch 70, biases the latch toward its pawl latching position seen in FIG. 3 from its non-latching position seen in FIG. 1. During a closing spring charging cycle while driving pawl 30 is incrementally clockwise advancing the ratchet wheel and holding pawl 36 is engaging the ratchet wheel periphery to preserve each incremental advancement, pin 36*b* carried by the holding pawl is disposed in a recess 78 formed in the upper edge of latch 70. As tip 36*a* of holding pawl 36 rides over each ratchet tooth 22, pin 36*b* is not elevated sufficiently to clear the higher side 78*a* of recess 78, thereby inhibiting sliding movement of latch 70 to its latching position of FIG. 3 under the urgence of spring 74 during a closing spring charging cycle. Also interacting with latch 70 is a pin 30*b* carried to driving pawl 30. While during a charging cycle, retention of latch 70 in its non-latching position of FIG. 1 is effected by the disposition of holding pawl pin 36*b* in recess 78*a*, driving pawl pin 30*b* does engage the angular nose 70*b* of the latch to reciprocate it during driving oscillation of the driving pawl. This reciprocation is however of a limited nature and at no time during a charging cycle does the latch 70 move upwardly under the urgence of spring 74 into its pawl latching position of FIG. 3. As will be seen, the function of driving pawl pin 30*b* is to forceably drive latch 70 from its latching position to its non-latching position incident with the first oscillation of the driving pawl as the ratcheting mechanism pin starts into a new closing spring charging cycle.

When the ratchet wheel 20 arrives at its angular position of FIG. 1, the closing springs are fully charged, but their discharge is inhibited by the engagement of prop 44 with post 42, as previously described. The tip 30*a* of driving pawl encounters the missing tooth peripheral section 20*a* of the ratchet wheel, thereby rendering the driving pawl ineffective in further incrementally advancing the ratchet wheel. Motor 24 of the circuit breaker motor operator is shut down, leaving the tip 30*a* of the driving pawl in engagement with the ratchet wheel periphery at some point along the missing tooth section 20*a* thereof. Tip 36*a* of holding pawl 36 is also engaging the periphery of the ratchet wheel by virtue of the bias of its torsion spring 38, as seen in FIG. 1.

When prop 44 is articulated by closing solenoid 46 to release ratchet wheel 20, the closing springs 18 discharge, rapidly overdriving the ratchet wheel in the clockwise direction. In the process, one of the ratchet teeth 22 impacts against the tip 30*a* of driving pawl 30, kicking it in the counterclockwise direction about crank pin 28. Excessive counterclockwise movement of the driving pawl is arrested by the presence of a stop pin 80 mounted by right frame sideplate 12. It is seen from FIG. 3, that with the driving pawl kicked upwardly into engagement with stop pin 80, its pin 30*b* is elevated above the upper edge of latch 70. Essentially coincidentally, one of the ratchet wheel teeth 22 engages tip 36*a* of holding pawl 36, kicking it away from the periphery of the ratchet wheel against the bias of torsion spring 38. The spring force of this torsion spring is selected such that the impact of a ratchet wheel tooth with the holding pawl tip is sufficient to kick the holding pawl upward sufficiently to clear its pin 36*b* from recess 78. Under these circumstances, it is seen that latch 70 is now free to move under the bias of its spring 74 to its latching position seen in FIG. 3, wherein its upper edge portion 70*c* to the right of recess 78 is positioned in intercepting relation with pin 36*b* to prevent the holding pawl from returning into engaging relation with the ratchet wheel periphery under the urgence of torsion spring 38. Thus the holding pawl is latched up in an inoperative position safely removed from the ratchet wheel periphery. Since motor 24 is de-energized, there is no moment acting on driving pawl 30 tending to swing it downwardly into engagement with the ratchet wheel periphery, and thus it remains in an inoperative position safely removed from the ratchet wheel periphery.

After the closing springs 18 have fully discharged to close the breaker contacts, and it is desired to execute a new charging cycle by energizing motor 24, it is seen that, during the first oscillation of driving pawl 30, its pin 30*b* will be moved to the left beyond nose 70*b* of latch 70. The moment now acting on the driving pawl will swing the driving pawl downwardly to bring its tip into engagement with the ratchet wheel periphery. As the driving pawl starts into a rightward driving stroke, pin 30*b* engages nose 70*b* of latch 70, driving the latch back to its non-latching position of FIG. 1 coincidentally with the initial incremental clockwise advancement of the ratchet wheel. Latch edge portion 70*b* moves out from under holding pawl pin 36*b*, and its torsion spring 38 biases the holding pawl downwardly into engagement with the ratchet wheel periphery as pin 36*b* drops down into latch recess 78. Pin 36*b*, now operating in recess 78, holds latch 70 in its nonlatching position permitting the holding pawl to operatively engage the ratchet wheel periphery pursuant to sustaining each incremental advance of the ratchet wheel by the driving pawl.

It will be noted that the ratcheting mechanism of the present invention will also accommodate manual operation pursuant to charging the closing springs. To this end, a hand crank (not shown) is drivingly connected to the right end of shaft 14, as viewed in FIG. 4. Since driving pawl 30 is not being driven, there is no moment urging its tip 30*a* into engagement with the ratchet wheel periphery. Consequently it will be lifted by a ratchet tooth 22 to an inoperative position where it will remain throughout a manual charging cycle and the ensuing discharge cycle. However, the holding pawl will remain in its operative position to sustain manual advancement of the ratchet wheel and to detain latch 70 in its nonlatching position. When the closing springs 18 are permitted to discharge, holding pawl 36 is kicked to its inoperative position, and latch 70 is freed for movement to its latching position detaining the holding pawl out of harm's way. If the ensuing charging cycle is powered by motor 24, latch 70 is automatically returned to its non-latching position in the manner described. However, if the ensuing charging cycle is to be manually powered, the latch must be manually reset to its non-latching position. To this end, latch 70 is provided with a notch 70*d* facilitating digital resetting of the latch.

It will thus be seen that the objects set forth above, among those made apparent in the preceding description, are efficiently attained and, since certain changes may be made in the above construction without departing from the scope of the invention, it is intended that all matter contained in the above description or shown in the accompanying drawings shall be interpreted as illustrative and not in a limiting sense.

Having described our invention, what we claim as new and desire to secure by Letters Patent is:

1. A ratcheting mechanism for a motor operator acting to charge a spring mechanism, said ratcheting mechanism comprising, in combination:

A. a ratchet wheel fixedly mounted on a shaft coupled to the spring mechanism and having a peripheral array of ratchet teeth;

B. a driving pawl coupled to be oscillated by an electromotive device, said driving pawl engaging said ratchet teeth to incrementally advance said ratchet wheel during a spring mechanism charging cycle to a predetermined angular position whereupon the spring mechanism is fully charged, during a discharging cycle of the spring mechanism said ratchet wheel is overdriven in the advancing direction;

C. a holding pawl engaging said ratchet teeth in alternating fashion with said driving pawl to sustain each incremental advance of said ratchet wheel during a charging cycle, said holding pawl being resiliently biased into engagement with the periphery of said ratchet wheel;

D. a latch mounted for movement between latching and non-latching positions; and E. control means carried by said holding pawl for engaging said latch during a charging cycle to maintain said latch in its non-latching position and disengaging said latch to enable its movement to said latching position incident to movement of said holding pawl to an inoperative position in disengaged relation with said ratchet wheel periphery in response to the overdriving of said ratchet wheel by the spring mechanism during a discharge cycle, said latch in its latching position interfering with said control means to prevent the return of said holding pawl to an operative position in engaged relation with said ratchet wheel periphery for the duration of the discharging cycle.

2. The ratcheting mechanism defined in claim 1, wherein separate control means are respectively carried by said driving and holding pawls, driving pawl control means engaging and returning said latch to its non-latching position incident with the initial oscillation of said driving pawl to begin a charging cycle, said latch, in its non-latching position, assuming a non-interfering relationship with said control means of both said pawls, to permit the return of said pawls to their respective operative positions in engaging relation with the ratchet wheel periphery.

3. The ratcheting mechanism defined in claim 2, which further includes spring means biasing said latch to said latching position from said non-latching position.

4. The ratcheting mechanism defined in claim 3, wherein said driving pawl is journaled on an eccentric crank pin carried by a crank drivingly rotated by the electromotive device to oscillate said driving pawl, said driving pawl being frictionally coupled with the crank so as to produce a moment on said driving pawl urging same into engagement with said ratchet wheel periphery while said driving pawl is being oscillated by the electromotive device, whereby upon termination of driving pawl oscillation preparatory to initiation of a discharge cycle, said driving pawl is moved to an inoperative position in disengaged relation with said ratchet wheel periphery in response to the overdriving of said ratchet wheel by spring mechanism where said driving pawl remains for the duration of said discharge cycle.

5. The ratcheting mechanism defined in claim 4, wherein said latch includes a recess in which said holding pawl control means is disposed to detain said latch in said non-latching position while said holding pawl is in its operative position engaging said ratchet wheel periphery, said latch further including a surface portion adjacent said recess engaging said holding pawl control means while said latch is in said latching position to detain said holding pawl in its inoperative position.

6. The ratcheting mechanism defined in claim 5, wherein said holding pawl control means is in the form of a pin carried by said holding pawl.

7. The ratcheting mechanism defined in claim 6, wherein said driving pawl control means is in the form of a pin carried by said driving pawl, with said latch in said latching position, said driving pawl pin engaging and propelling said latch back to said non-latching position incident with the initial oscillation of said driving pawl to start a charging cycle.

8. The ratcheting mechanism defined in claim 7, wherein said ratchet wheel includes a missing tooth peripheral surface section, upon conclusion of a charging cycle said ratchet wheel assumes a spring charged angular position such that said driving pawl encounters said missing tooth peripheral surface section, whereby said driving pawl is rendered ineffective in further advancing said ratchet wheel.

9. The ratcheting mechanism defined in claim 8, which further includes means selectively engaging said ratchet wheel upon its arrival at its spring charged angular position to inhibit initiation of a discharge cycle, said discharge cycle being controllably initiated upon disengagement of said ratchet wheel by said means.

10. The ratcheting mechanism defined in claim 7, wherein said frictional coupling between said driving pawl and said crank is provided by a compressed spring washer carried on said crank pin intermediate said driving pawl and said crank.

* * * * *